United States Patent
Takahashi et al.

(10) Patent No.: US 11,384,809 B2
(45) Date of Patent: Jul. 12, 2022

(54) SINTERED FRICTION MATERIAL AND PRODUCTION METHOD FOR SINTERED FRICTION MATERIAL

(71) Applicant: AKEBONO BRAKE INDUSTRY CO., LTD., Tokyo (JP)

(72) Inventors: Hideaki Takahashi, Tokyo (JP); Katsuhiro Onodera, Tokyo (JP); Atsushi Ueno, Tokyo (JP)

(73) Assignee: AKEBONO BRAKE INDUSTRY CO., LTD., Tokyo (JP)

(*) Notice: Subject to any disclaimer, the term of this patent is extended or adjusted under 35 U.S.C. 154(b) by 25 days.

(21) Appl. No.: 16/627,149

(22) PCT Filed: Jun. 18, 2018

(86) PCT No.: PCT/JP2018/023051
§ 371 (c)(1),
(2) Date: Dec. 27, 2019

(87) PCT Pub. No.: WO2019/003969
PCT Pub. Date: Jan. 3, 2019

(65) Prior Publication Data
US 2020/0158200 A1    May 21, 2020

(30) Foreign Application Priority Data
Jun. 27, 2017    (JP) .............................. JP2017-125099

(51) Int. Cl.
*F16D 69/02* (2006.01)
(52) U.S. Cl.
CPC .... *F16D 69/027* (2013.01); *F16D 2200/0008* (2013.01); *F16D 2200/0043* (2013.01); *F16D 2200/0086* (2013.01)
(58) Field of Classification Search
CPC ........... F16D 69/027; F16D 2200/0008; F16D 2200/0043; F16D 2200/0086
See application file for complete search history.

(56) References Cited

U.S. PATENT DOCUMENTS

| | | | | |
|---|---|---|---|---|
| 5,279,777 | A * | 1/1994 | Kojima | ............... F16D 69/026 264/29.5 |
| 6,051,277 | A | 4/2000 | Claussen et al. | |
| 2003/0026969 | A1 | 2/2003 | Nagata et al. | |
| 2010/0323876 | A1 | 12/2010 | Higashi et al. | |
| 2013/0203888 | A1 | 8/2013 | Lu et al. | |
| 2015/0287753 | A1 | 10/2015 | Suga et al. | |
| 2016/0312846 | A1* | 10/2016 | Miyaji | ............... F16D 69/027 |
| 2017/0284492 | A1 | 10/2017 | Unno et al. | |
| 2018/0216686 | A1 | 8/2018 | Unno et al. | |

FOREIGN PATENT DOCUMENTS

| | | |
|---|---|---|
| CN | 2246311 A1 | 3/1999 |
| CN | 101801851 A | 8/2010 |
| CN | 105909710 A | 8/2016 |
| CN | 106634832 A | 5/2017 |
| EP | 0900949 A1 | 3/1999 |
| JP | H09-227969 A | 9/1997 |
| JP | 2000-178026 A | 6/2000 |
| JP | 2003-113253 A | 4/2003 |
| JP | 2004-027035 A | 1/2004 |
| JP | 3492397 B2 | 2/2004 |
| JP | 5405725 B2 | 2/2014 |
| JP | 2014-122314 A | 7/2014 |
| JP | 2016-074812 A | 5/2016 |
| JP | 2016-098362 A | 5/2016 |
| JP | 2016-147968 A | 8/2016 |
| JP | 6061592 B2 | 12/2016 |
| JP | 2017-002185 A | 1/2017 |
| JP | 2017-057312 A | 3/2017 |

OTHER PUBLICATIONS

Translation of Table 1 and Table 2 of JP 2017-2185 A (Year: 2017).*
Translation of Table 1 of JP 2017-57312 A (Year: 2017).*
CN Office Action dated Nov. 18, 2000 in Chinese Application No. 201880043239.3 (with attached English-language translation).
International Search Report (PCT/ISA/210) dated Aug. 7, 2018 in PCT/JP2018/023051.
Written Opinion of the ISA (PCT/ISA/237) dated Aug. 7, 2018 in PCT/JP2018/023051.
Extended European Search Report dated Apr. 23, 2021 in corresponding European patent application 18823035.3 (9 pages).
JP Office Action dated Apr. 13, 2021 from counterpart Japanese patent application No. 2017-125099 (with attached English-language translation).
Fukuji, "Ageing of Plastics," National Defense Industry Press, p. 290, first printed Feb. 1977.
Second Office Action dated May 10, 2021 in Chinese Patent Application No. 201880043239.3 (7 pages) with an English translation (7 pages).
Notice of Reasons for Refusal dated Nov. 2, 2021 in Japanese Patent Application No. 2017-125099 (3 pages) with English translation (4 pages).

* cited by examiner

Primary Examiner — Anthony J Green
(74) Attorney, Agent, or Firm — Faegre Drinker Biddle & Reath LLP

(57) ABSTRACT

A sintered friction material includes a copper component in an amount of 0.5% by mass or less, a titanate as a matrix, a ceramic material, and a lubricant. A method for manufacturing a sintered friction material includes a step of mixing raw materials including a titanate for forming a matrix, a step of molding the raw materials, and a step of sintering a molded body molded in the molding step. In the method, a sintering temperature in the sintering step is 900° C. to 1300° C.

21 Claims, No Drawings

SINTERED FRICTION MATERIAL AND PRODUCTION METHOD FOR SINTERED FRICTION MATERIAL

TECHNICAL FIELD

The present invention relates to a sintered friction material and a method for manufacturing the sintered friction material.

BACKGROUND ART

In recent years, it has been noted that a friction material containing a copper component contains copper in abrasion powder generated during braking, which may cause river, lake, or marine contamination. Therefore, a motion of limiting the use of the friction material containing a copper component is rising, and a friction material excellent in friction performance even containing a copper component with high environmental load in a few amount is required.

For example, Patent Literature 1 discloses a sintered friction material which uses a combination of reduced iron powder and cast iron powder as a matrix as a substitute material for copper.

Patent Literature 2 discloses a spherical alkali titanate powder-containing composite material.

Patent Literature 3 discloses a composite titanium compound powder which can be applied to a friction material constituting a brake device of an automobile or the like.

Patent Literature 4 discloses a friction material containing, as a matrix, at least one selected from the group consisting of oxide ceramics and nitride ceramics, and containing graphite.

CITATION LIST

Patent Literature

Patent Literature 1: Japanese Patent No. 5405725
Patent Literature 2: Japanese Patent No. 3492397
Patent Literature 3: JP-A-2000-178026
Patent Literature 4: Japanese Patent No. 6061592

SUMMARY OF INVENTION

Technical Problem

The iron used in the technique described in Patent Literature 1 has similarities to copper, such as close melting point, and is likely to be used as a matrix of a copper-free sintered friction material, but the friction material containing a certain amount of iron has room for improvement in weight. In addition, in a speed range where an initial speed is about 300 km/h, the performance of an iron-based sintered friction material containing only iron as a matrix is considerably lower than that of that of a copper-based sintered friction material.

In addition, the spherical alkali titanate powder-containing composite material described in Patent Literature 2 is a composite material containing a thermoplastic resin or a thermosetting resin as a matrix. That is, Patent Literature 2 does not mention or suggest at all a friction material having spherical alkali titanate powder as a matrix, and of course, the evaluation on a friction material is not performed.

In addition, Patent Literature 3 describes a brake disc pad containing the composite titanium compound powder, but this brake disc pad is an organic friction material having a phenolic resin as a matrix, and the average friction coefficient has room for improvement from the viewpoint of heat resistance.

Further, the wear amount at an initial speed of 50 km/h is considered in the friction material described in Patent Literature 4, but the average friction coefficient and the wear amount of the pad at a speed higher than the above speed are not considered.

The present invention has been made in view of the above circumstances in the related art, and an object of the present invention is to provide a lightweight sintered friction material which does not contain a copper component or contains a copper component in an amount equal to or less than a certain amount as an environment compatible friction material, and has sufficient friction coefficient and abrasion resistance at a high speed range.

Solution to Problem

As a result of intensive studies, the present inventors have invented that a titanate is used as a matrix in a sintered friction material to solve the above problems. Thus, the present invention has been completed.

That is, the present invention relates to the following <1> to <7>.

<1> A sintered friction material, containing: a copper component of 0.5 mass % or less; a titanate as a matrix; a ceramic material; and a lubricant.

<2> The sintered friction material according to <1>, wherein the titanate contains at least one salt selected from a group consisting of an alkali metal titanate, an alkaline earth metal titanate, and a titanate complex.

<3> The sintered friction material according to <1> or <2>, wherein the titanate contains at least one salt selected from a group consisting of potassium titanate, lithium potassium titanate and magnesium potassium titanate.

<4> The sintered friction material according to any one of <1> to <3>, wherein the titanate is contained in 10% by volume to 60% by volume.

<5> The sintered friction material according to any one of <1> to <4>, further containing a metal material other than copper.

<6> The sintered friction material according to any one of <1> to <5>, wherein a density is 2.3 g/cm$^3$ to 4.0 g/cm$^3$.

<7> A method for manufacturing a sintered friction material, including: a step of mixing raw materials including a titanate for forming a matrix; a step of molding the raw materials; and a step of sintering a molded body molded in the molding step, wherein a sintering temperature in the sintering step is 900° C. to 1300° C.

Advantageous Effects of Invention

According to the present invention, it is possible to provide a lightweight sintered friction material which is environmentally friendly and has sufficient friction coefficient and abrasion resistance at a high speed range.

DESCRIPTION OF EMBODIMENTS

Hereinafter, the present invention will be explained below in detail, but the following explanations only show an example of preferred embodiments, the present invention is not limited thereto.

In the present description, "mass" has the same meaning as "weight",

[Configuration of Sintered Friction Material]

The sintered friction material according to the present contains: a copper component in an amount of 0.5 mass % or less; a titanate as a matrix; a ceramic material; and a lubricant.

<Matrix>

In the present description, "matrix" means one to be the main skeleton of the friction material. The content of the component to be a matrix in the friction material varies depending on the type of the component. In a case where a titanate is contained as a matrix, the content of the titanate is preferably 10% by volume or more, more preferably 12% by volume or more, and still more preferably 15% by volume or more.

When the content of the titanate is 10% by volume or more, the titanate itself can be sintered to form the skeleton of the friction material when a raw material containing the titanate is molded and sintered.

In addition, the content of the titanate is preferably 60% by volume or less, more preferably 58% by volume or less, and still more preferably 55% by volume or less.

When the content of the titanate is 60% by volume or less, other components necessary as a friction material, such as an abrasive and a lubricant, can be sufficiently contained.

For example, in a case where a friction material containing a resin as a matrix contains a titanate as a filler, the friction material has a low heating temperature during manufacture, so that the titanate remains in the friction material while being mixed as a raw material. The titanate in this case and the titanate in the sintered friction material using the titanate as a matrix according to the present invention can be clearly distinguished by Scanning Electron Microscope (SEM) observation or the like. In the sintered friction material according to the present invention, the titanate itself is in a sintered state, and forms a matrix.

The titanate is a compound having high abrasion resistance or the like, and contributes to enhancing the abrasion resistance or the like of the friction material.

In addition, since the titanate has a density lower than that of a metal such as iron, the friction material containing the titanate as a matrix can have a density lower than that of an iron-based sintered friction material containing only iron as a matrix, and thus the weight can be reduced.

As the titanate used in the present invention, an alkali metal titanate, an alkaline earth metal titanate, a titanate complex salt and the like are preferred from the viewpoints of heat resistance and abrasion resistance. Specific examples thereof include potassium titanate, lithium titanate, lithium potassium titanate, sodium titanate, calcium titanate, magnesium titanate, magnesium potassium titanate, and barium titanate or the like.

Further, in consideration of working environment hygiene, a titanate having a shape other than a so-called whisker (fiber) shape, such as a spherical shape, a plate shape, a scaly shape, or a columnar shape, is preferably used.

Among these, the titanate used in the present invention preferably contains at least one titanate selected from potassium titanate, lithium potassium titanate and magnesium potassium titanate, from the viewpoint of improving heat resistance or abrasion resistance.

<Ceramic Material>

The sintered friction material according to the present invention contains a ceramic material. When the ceramic material is contained, the ceramic material performs as an abrasive, and the sintered friction material according to the present invention can obtain a desired friction coefficient.

The content of the ceramic material in the entire sintered friction material according to the present invention is preferably 5% by volume to 25% by volume from the viewpoint of the balance between abradability and aggressiveness against the counterpart material.

Examples of the ceramic material include: those used as an abrasive of the friction material, such as magnesia, alumina, silica, zirconia, zirconium silicate, chromium oxide, ferroferric oxide ($Fe_3O_4$), and chromite; and ceramic fibers such as an alumina fiber. With regard to the ceramic fiber, a biosoluble ceramic fiber is preferably used in consideration of working environment hygiene. These material can be used alone or in combination of two or more thereof.

Among these, magnesia and alumina are preferred from the viewpoint of the balance between abradability and aggressiveness against the counterpart material.

<Lubricant>

The sintered friction material according to the present invention contains a lubricant. When the lubricant is contained, seizure with the counterpart material can be prevented and the life (abrasion resistance) of the sintered friction material can be improved.

The content of the lubricant in the entire sintered friction material according to the present invention is preferably 35% by volume to 55% by volume from the viewpoint of abrasion resistance.

Examples of the lubricant include artificial graphite, natural graphite, coke, antimony trisulfide, molybdenum disulfide, tin sulfide, iron sulfide, and zinc sulfide or the like. These material can be used alone or in combination of two or more thereof.

Among these, artificial graphite and natural graphite are preferred from the viewpoint of sinterability and abrasion resistance.

<Metal Material>

The sintered friction material according to the present invention can contain a metal material other than copper. When the metal material other than copper is contained, the matrix can be reinforced.

The content of the copper component in the entire sintered friction material according to the present invention is 0.5% by mass or less and it is preferable not to contain the copper, from the viewpoint of environmental load reduction.

The content of the metal material other than copper in the entire sintered friction material according to the present invention is preferably 5% by volume to 10% by volume from the viewpoint of matrix reinforcement.

Examples of the metal material other than copper include titanium, aluminum, silicon, zinc, iron, tin, or a Fe—Al intermetallic compound or the like. These material can be used alone or in combination of two or more thereof. These metal material can be used in any form such as powder or fiber.

Among these, iron a powder form (iron powder) is preferred from the viewpoint of matrix reinforcement.

<Density>

When the titanate is contained as a matrix, the sintered friction material according to the present invention can have a density lower than that of a sintered friction material containing only a metal such as copper and iron as a matrix. The density of the sintered friction material according to the present invention is preferably 2.3 $g/cm^3$ to 4.0 $g/cm^3$.

When the density of the sintered friction material is less than 2.3 $g/cm^3$, the porosity of the sintered friction material tends to increase and the strength thereof tends to decrease, and when the density of the sintered friction material is more than 4.0 g/cm³, the hardness of the sintered friction material tends to increase and the friction coefficient thereof tends to decrease.

The density of the sintered friction material can be measured by calculating the volume from the dimensions and measuring the weight.

[Method for Manufacturing Sintered Friction Material]

The sintered friction material according to the present invention can be manufactured by a step of mixing raw materials including a titanate forming a matrix, a step of molding the raw materials, and a step of sintering a molded body molded in the molding step.

The mixing method used in the step of mixing the raw materials is not particularly limited as long as the raw materials are uniformly mixed, and any known method can be used. Specifically, an appropriate amount of an organic solvent may be added to the raw materials, and wet mixing may be performed using a rotary mixer or the like so as to uniformly disperse the raw materials.

Next, the step of molding the raw materials of the sintered friction material obtained in the above step is performed. In the molding step, dry molding methods such as uniaxial pressure molding and CIP molding (cold isostatic molding); plastic molding methods such as injection molding and extrusion molding; casting methods such as slip casting, pressure casting and rotary casting; tape molding methods such as a doctor blade method; and cold press or the like can be used appropriately. The above molding methods may be used alone or in combination of two or more thereof.

The molding surface pressure in the molding step is preferably 300 MPa to 900 MPa from the viewpoint of moldability.

In the step of sintering the molded body molded in the above step, the sintering can be performed by an atmosphere sintering method, a reaction sintering method, a normal pressure sintering method, a thermal plasma sintering method, or the like. The sintering temperature and the holding time at the sintering temperature in the sintering step can be appropriately set according to the type and content of the titanate to be a matrix.

In the present invention, the sintering temperature in the sintering step is 900° C. to 1300° C., preferably 950° C. to 1250° C., and more preferably 1000° C. to 1200° C.

When the sintering temperature is lower than 900° C., the matrix becomes brittle, and when the sintering temperature is higher than 1300° C., the raw materials may start to melt.

The holding time at the sintering temperature also varies depending on the type and content of the titanate to be a matrix, and is preferably 30 minutes to 180 minutes from the viewpoint of sinterability.

In addition, in the sintering step, it is preferable to sinter while pressing the molded body. The sintering surface pressure in the sintering step is preferably 1 MPa to 18 MPa from the viewpoint of sinterability.

The sintering may be performed in air or in an inert gas such as nitrogen gas and argon gas, depending on the type of the titanate to be a matrix and the type of the raw materials to be added, or may be performed in a reducing gas such as carbon monoxide gas and hydrogen gas. The sintering may also be performed in vacuum.

The sintered friction material according to the present invention is manufactured by applying a processing such as cutting, grinding, and polishing, to the sintered body obtained through the above steps, if necessary.

EMBODIMENTS

The present invention will be specifically described by way of the following embodiments, but the present invention is not limited thereto.

Embodiments 1 to 11 and Comparative Example 1

The raw materials of the sintered friction material, that is, compositions shown in Table 1, are mixed using a mixer.

Next, the obtained mixture of the raw materials is molded by cold pressing at a molding surface pressure of 900 MPa.

The obtained molded product is put into a graphite mold and sintered by a hot press method to obtain sintered friction materials of Embodiments 1 to 11 and Comparative Example 1. The sintering conditions are as shown in Table 1.

(Density)

The density of the obtained sintered friction material is measured by calculating the volume from the dimensions and measuring the weight.

The results are shown in Table 1.

(Friction Test)

A test piece is prepared from the obtained sintered friction material, and a friction test is performed under the following test conditions using a Friction Analyzer friction tester manufactured by Akebono Engineering Co., Ltd.

Disc effective radius: 179 mm
Friction material area: 7 cm²
Inertia: 8 kg·m²
Pressing force: 0.5 MPa
Peripheral speed: 33 m/sec (corresponding to an initial speed of 170 km/h) or 58 m/sec (corresponding to an initial speed of 300 km/h)

Under the above conditions, the average friction coefficient (μ) and the wear amount of the sintered friction material are measured.

The results are shown in Table 1.

TABLE 1

| | | | | | | | | | | | | | (% by volume) |
|---|---|---|---|---|---|---|---|---|---|---|---|---|---|
| | | Embodiment | | | | | | | | | | | Comparative Example |
| | | 1 | 2 | 3 | 4 | 5 | 6 | 7 | 8 | 9 | 10 | 11 | 1 |
| Matrix | Potassium titanate | 10 | 12 | 15 | 21 | 26 | 40 | 55 | 58 | 60 | — | — | — |
| | Lithium potassium titanate | — | — | — | — | — | — | — | — | — | 10 | — | — |
| | Magnesium potassium titanate | — | — | — | — | — | — | — | — | — | — | 10 | — |
| Ceramic | Magnesia | 5 | 5 | 5 | 4 | 4 | 2 | 2 | 2 | 2 | 5 | 5 | 5 |
| material | Alumina | 20 | 20 | 20 | 20 | 20 | 10 | 5 | 4 | 3 | 20 | 20 | 20 |
| Lubricant | Artificial graphite | 45 | 44 | 43 | 40 | 40 | 38 | 32 | 31 | 30 | 45 | 45 | 40 |
| | Natural graphite | 10 | 10 | 10 | 10 | 10 | 10 | 6 | 5 | 5 | 10 | 10 | 10 |

TABLE 1-continued

|  |  | Embodiment | | | | | | | | | | | (% by volume) Comparative Example |
|---|---|---|---|---|---|---|---|---|---|---|---|---|
|  |  | 1 | 2 | 3 | 4 | 5 | 6 | 7 | 8 | 9 | 10 | 11 | 1 |
| Metal material | Iron powder | 10 | 9 | 7 | 5 | — | — | — | — | — | 10 | 10 | 25 |
| Sintering condition | Molding surface pressure (MPa) | | | | | | | 900 | | | | | |
|  | Sintering surface pressure (MPa) | | | | | | | 18 | | | | | |
|  | Sintering temperature (° C.) | | | | | | 1100 | | | | | | 1150 |
|  | Sintering holding time (min) | | | | | | | 180 | | | | | |
| Density (g/cm³) | | 4.0 | 3.6 | 3.2 | 2.8 | 2.5 | 2.3 | 2.6 | 2.9 | 3.2 | 4.0 | 4.0 | 4.5 |
| Friction test | Average friction coefficient at initial speed 300 km/h | 0.49 | 0.50 | 0.51 | 0.52 | 0.50 | 0.45 | 0.44 | 0.44 | 0.43 | 0.47 | 0.46 | 0.41 |
|  | Wear amount (μm) of sintered friction material at initial speed 170 km/h | 3.8 | 3.9 | 4.4 | 5.4 | 6.5 | 7.1 | 7.7 | 8.0 | 8.3 | 4.3 | 4.5 | 10.5 |
|  | Wear amount (μm) of sintered friction material at initial speed 300 km/h | 21.8 | 22.1 | 23 | 24.5 | 26.6 | 32.1 | 32.6 | 33.0 | 33.3 | 22.2 | 23.1 | 42.4 |

The sintered friction materials of Embodiments 1 to 11 are lower in density and lighter, and had a higher average friction coefficient and a smaller wear amount, as compared with the iron-based sintered friction material of Comparative Example 1.

Although the present invention has been described in detail using specific embodiments, it will be apparent to those skilled in the art that various modifications and variations are possible without departing from the spirit and scope of the present invention. The present application is based on a Japanese Patent Application (Patent Application No. 2017-125099) filed on Jun. 27, 2017, contents of which are incorporated herein by reference.

INDUSTRIAL APPLICABILITY

The sintered friction material according to the present invention is a low environmental load friction material because of not containing a copper component or containing a copper component only in a certain amount or less. In addition, the sintered friction material according to the present invention is lighter than an iron-based sintered friction material containing only iron as a matrix, and has excellent friction coefficient and abrasion resistance in a high speed range.

The sintered friction material according to the present invention can be used as a brake for general transportation equipment such as a passenger vehicle, a commercial vehicle, a two-wheeled vehicle, and a railway, or an industrial machine.

The invention claimed is:

1. A sintered friction material, comprising:
   a copper component in an amount of 0.5% by mass or less;
   a titanate as a matrix;
   a ceramic material; and
   a lubricant, wherein
   the ceramic material is at least one of magnesia, alumina, silica, zirconia, zirconium silicate, chromium oxide, ferroferric oxide, and chromite,
   a content of the ceramic material in the entire sintered friction material is 5% by volume to 25% by volume, and
   the titanate itself is in a sintered state.

2. The sintered friction material according to claim 1, wherein the titanate contains at least one salt selected from a group consisting of an alkali metal titanate, an alkaline earth metal titanate, and a titanate complex.

3. The sintered friction material according to claim 1, wherein the titanate contains at least one salt selected from a group consisting of potassium titanate, lithium potassium titanate and magnesium potassium titanate.

4. The sintered friction material according to claim 1, wherein the titanate is contained in 10% by volume to 60% by volume.

5. The sintered friction material according to claim 2, wherein the titanate is contained in 10% by volume to 60% by volume.

6. The sintered friction material according to claim 3, wherein the titanate is contained in 10% by volume to 60% by volume.

7. The sintered friction material according to claim 1, further comprising a metal material other than copper.

8. The sintered friction material according to claim 2, further comprising a metal material other than copper.

9. The sintered friction material according to claim 3, further comprising a metal material other than copper.

10. The sintered friction material according to claim 4, further comprising a metal material other than copper.

11. The sintered friction material according to claim 6, further comprising a metal material other than copper.

12. The sintered friction material according to claim 1, wherein a density is 2.3 g/cm³ to 4.0 g/cm³.

13. The sintered friction material according to claim 2, wherein a density is 2.3 g/cm³ to 4.0 g/cm³.

14. The sintered friction material according to claim 3, wherein a density is 2.3 g/cm³ to 4.0 g/cm³.

15. The sintered friction material according to claim 4, wherein a density is 2.3 g/cm³ to 4.0 g/cm³.

16. The sintered friction material according to claim 6, wherein a density is 2.3 g/cm³ to 4.0 g/cm³.

17. The sintered friction material according to claim 7, wherein a density is 2.3 g/cm³ to 4.0 g/cm³.

18. The sintered friction material according to claim 1, wherein the sintered friction material is sintered at a sintering temperature of 900° C. to 1300° C.

19. A method for manufacturing a sintered friction material, comprising:
    a step of mixing raw materials including a titanate for forming a matrix and a ceramic material;
    a step of molding the raw materials; and a step of sintering a molded body molded in the molding step, wherein the ceramic material is at least one of magnesia, alumina, silica, zirconia, zirconium silicate, chromium oxide, ferroferric oxide, and chromite, a content of the ceramic material in the entire sintered friction material is 5% by volume to 25% by volume, and the titanate itself is in a sintered state.

20. The method for manufacturing a sintered friction material according to claim 19, wherein a sintering temperature in the sintering step is 900° C. to 1300° C.

21. A method for manufacturing a sintered friction material, comprising:

a step of mixing raw materials including a titanate for forming a matrix and a ceramic material;

a step of molding the raw materials; and a step of sintering a molded body molded in the molding step, wherein the ceramic material is at least one of magnesia, alumina, silica, zirconia, zirconium silicate, chromium oxide, ferroferric oxide, and chromite, a content of the ceramic material in the entire sintered friction material is 5% by volume to 25% by volume, and the titanate contains at least one salt selected from a group consisting of potassium titanate, lithium potassium titanate, and magnesium potassium titanate.

* * * * *